United States Patent [19]

Peterson

[11] Patent Number: 4,940,859

[45] Date of Patent: Jul. 10, 1990

[54] TELEPHONE CORD TAKE-UP REEL ASSEMBLY

[76] Inventor: Daniel Peterson, 152 Rivera Ct., Chula Vista, Calif. 92011

[21] Appl. No.: 384,162

[22] Filed: Jul. 24, 1989

[51] Int. Cl.⁵ ............................................ H02G 11/02
[52] U.S. Cl. .............................. 191/12.4; 191/12.2 R; 379/457
[58] Field of Search .................... 191/12.2 R, 12.4; 310/232; 242/107, 107.12, 107.2; 379/438, 457

[56] References Cited

U.S. PATENT DOCUMENTS

| | | | |
|---|---|---|---|
| 793,845 | 7/1904 | Long | 191/12.2 R |
| 1,171,745 | 2/1916 | Mundy . | |
| 1,222,376 | 4/1917 | Fergusson | 191/12.2 R |
| 1,247,672 | 11/1917 | Hallberg | 191/12.2 R |
| 1,271,872 | 7/1918 | Eleyet | 191/12.2 R |
| 1,276,825 | 8/1918 | Swope | 191/12.2 R |
| 1,737,978 | 11/1929 | Sebell | 191/12.2 R |
| 1,865,069 | 6/1931 | Allen | 379/438 |
| 2,821,579 | 1/1958 | Benjamin | 191/12.4 |
| 3,815,078 | 6/1974 | Fedrick | 191/12.4 |
| 4,384,688 | 5/1983 | Smith | 191/12.2 R |
| 4,713,497 | 12/1987 | Smith | 191/12.2 R |
| 4,735,377 | 4/1988 | Zuehsow | 191/12.2 R |

*Primary Examiner*—Robert P. Olszewski
*Assistant Examiner*—A. Muratori
*Attorney, Agent, or Firm*—Andsel Group

[57] ABSTRACT

A telephone cord take-up reel assembly having a take-up reel housing formed from a cover and a base member that is mounted on the wall of a room. A shaft is supported in the take-up reel housing and it passes through the inner hub of a take-up reel upon which is wound a predetermined length of telephone cord. A metal reel spring formed in the shape of a coil has its inner end connected to the shaft and its outer end connected to the inner surface of the hub of the take-up reel. This is the structure that causes the telephone cord to be automatically reeled into the take-up reel housing. A cutout slot is formed in the top wall of the cover and one end of the telephone cord is passed outwardly therethrough. A cord stopper assembly is mounted on a portion of the telephone cord outside the take-up reel housing. This cord stopper assembly may adjustably positioned along the length of the telephone cord. A male telephone adapter passes through an aperture in the rear wall of the base member and it is electrically connected to the end of the telephone cord that is wound on the take-up reel.

3 Claims, 1 Drawing Sheet

U.S. Patent      Jul. 10, 1990      4,940,859
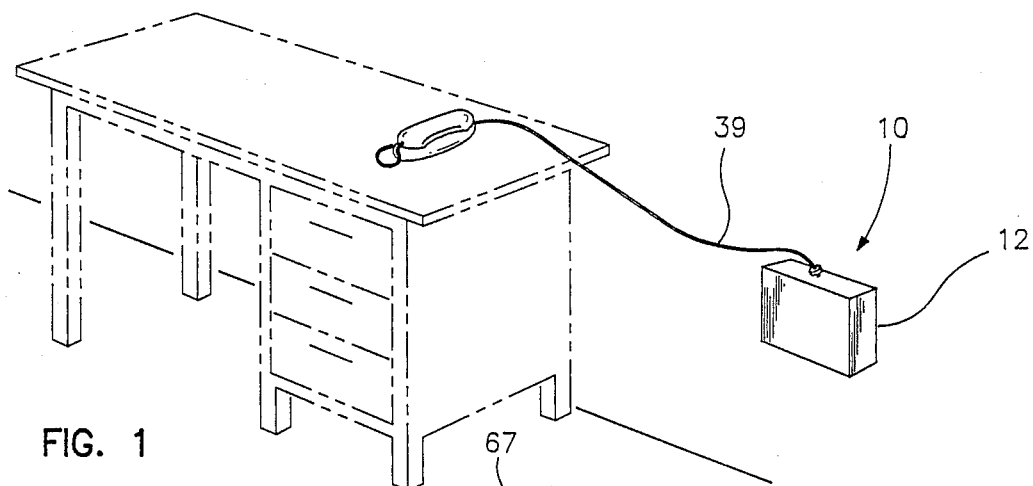
FIG. 1
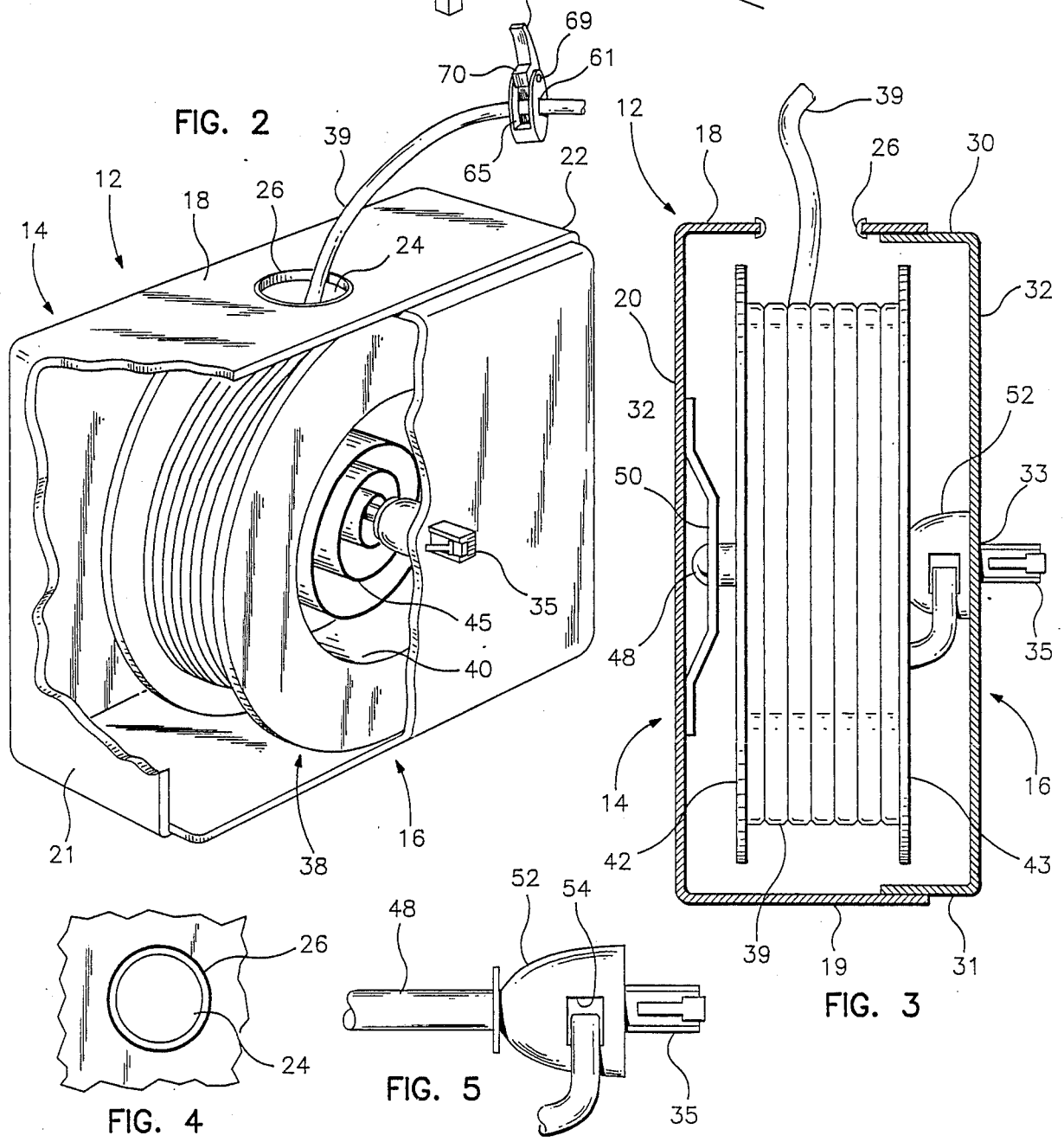
FIG. 2
FIG. 3
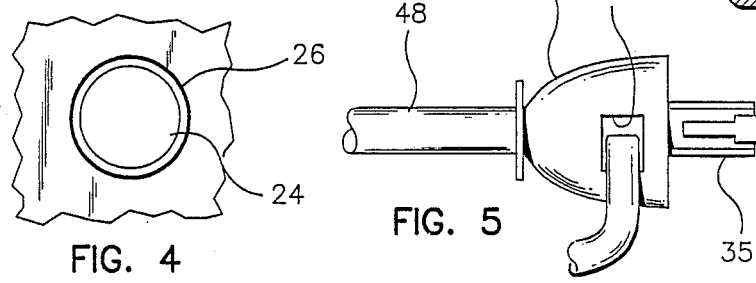
FIG. 4
FIG. 5

TELEPHONE CORD TAKE-UP REEL ASSEMBLY

BACKGROOUND OF THE INVENTION

The invention relates to telephones and more specifically to a portable telephone cord take-up reel that allows the person using the telephone to walk around with the telephone while speaking on the telephone. As that person returns toward the take-up reel housing, the excess length of the telephone cord is automatically reeled into the take-up reel housing.

Telephones are one of the most popular inventions of all times. Nearly every household has at least one telephone and many have more than one unit. While using a telephone it is not uncommon to walk about the room or to go into another room. People change location while looking for a pen, pencil or paper for messages, or simply to change seating or just to walk about. Telephone cords which extend from the wall outlet to the telephone base are usually not long enough to permit wide mobility. In those cases where a person has added additional cording footage to achieve mobility, there is still the problem of entanglement and cord storage while said cord is not in use. The cordage is left laying on the floor where it can be unsightly and it is also a possible tripping hazard for causing a fall.

It is an object of the invention to provide a novel telephone cord take-up assembly that gives mobility to the user while talking on the telephone.

It is also an object of the invention to provide a novel telephone cord take-up reel assembly that provides for the out of sight storage and automatic storage of telephone cording when not in use.

It is another object of the invention to provide a novel telephone cord take-up reel assembly that is economical to manufacture and market.

It is an additional object of the invention to provide a novel telephone cord take-up reel assembly that can be installed or removed in a very short period of time by practically any adult.

SUMMARY OF THE INVENTION

Applicant's device allows for the storage and release of an extra length of telephone cord. It is mounted on a wall plate over the outlet where the telephone line comes into the room. It is capable of being pre-set for length so as to permit a telephone to rest upon a desk, dresser or the like while the telephone cord reaches to the take-up reel housing with the desired amount of slack. The excess length of telephone cord is stored within the take-up reel housing and can be reeled outward as required by the user.

The telephone cord take-up reel assembly has a take-up reel housing formed from a cover and a base member that is mounted on the wall of a room. A take-up reel is mounted within the housing and it has a predetermined length of telephone cord would thereon. One end of the telephone cord passes through a cutout slot in the top wall of the cover. A plurality of curved rollers are mounted in this cutout slot to provide a rolling surface to prevent fretting and fraying of the protective insulation of the telephone cord. The inner end of the telephone cord is connected through a slip ring connector to the male telephone adapter that extends outwardly through an aperture in the rear wall of the take-up housing.

The take-up reel has an inner hub with laterally spaced annular flanges extending radially outwardly therefrom. A shaft passes through the inner hub and it has its opposite ends supported within the take-up reel housing. A metal reel spring formed in the shape of a coil has its inner end connected to the shaft and its outer end connected to the inner surface of the inner hub of the take-up reel. This is the structure which automatically reels the telephone cord back into the take-up reel.

A cord stopper assembly is mounted on the telephone cord at a position outside the take-up reel housing. This cord stopper assembly may be slid along the length of the take-up telephone cord and locked at any desired position. The cord stopper assembly stops the movment of the telephone cord as the cord winds on to the reel of the take-up reel housing.

DESCRIPTION OF THE DRAWINGS

FIG. 1 is a perspective view illustrating the novel telephone cord take-up reel assembly mounted on the wall of a room;

FIG. 2 is a rear perspective view of the telephone cord take-up reel assembly with portions broken away;

FIG. 3 is a side cross sectional view of the take-up reel housing;

FIG. 4 is a partial top plan view of the cover showing the cutout slot; and

FIG. 5 is a cross sectional view illustrating the manner in which the shaft, the slip ring connector, and the telephone adapter connected to each other.

DESCRIPTION OF THE PREFERRED EMBODIMENT

Applicant's novel telephone cord take-up reel assembly will now be described by referring to FIGS 1-5 of the drawings. The telephone cord take-up reel assembly is generally designated numeral 10.

Take-up reel housing 12 is formed from a cover 14 and a base member 16. Cover 14 has a top wall 18, a bottom wall 19, a front wall 20, and laterally spaced side walls 21 and 22. A cutout slot 24 is formed in top wall 18. A gormmet 26 extends around its inner surface.

Base member 16 has a top wall 30, a bottom wall 31, and a rear wall 32. An apperture 33 is formed in rear wall 32 and a male telephone adapter 35 extends upwardly therethrough. It would mate with the conventional female telephone adapter that is normally mounted in the wall of a room.

A take-up reel 38 has a predetermined length of telephone cord 39 wrapped around its inner hub 40 between its radially outwardly extending annular flanges 42 and 43. A metal reel spring formed in the shape of a coil has its outer end secured to the inner surface of inner hub 40. The inner end of metal reel spring 45 is secured to the outer surface of shaft 48. One end of shaft 48 is mounted in an aperture in a bracket 50 that is secured to the inner surface of front wall 20 of cover 14. The other end of shaft 48 is connected to slip ring connector 52. Slip ring connector 52 has a female socket 54 in its side wall form receiving one end of telephone cord 39.

Cord stopper assembly 60 has an aperture 61 which allows it to slip over telephone cord 39 and can be slipped along its length. Cordage stopper assembly 60 has a side wall 63 having a slot 65 formed therein. A cam lever 67 is received in slot 65 and a pin 69 pivotally secures them together. A cam lobe 70 on cam lever 67 frictionally locks the cord stopper assembly on the telephone cord when the cam lever is pivoted downwardly.

The drawings as shown and thusly described represent the preferred embodiment of the invention. It would be obvious to one skilled in the art that various changes and modifications, simple or complex, could be made to the preferred embodiment which would alter the appearance but not the scope and spirit of the invention. It is the intention of the inventor to preclude the occurence of such emulations in spirit and scope to the preferred embodiment through the following claims.

What is claimed is:

1. A telephone cord take-up reel asembly comprising:
   a take-up reel housing having a base member and a cover, said base member having a vertically oriented rear wall with an aperture therein, said rear wall having an inner surface, said cover having a vertically oriented front wall, a bottom wall, laterally spaced side walls and a top wall having a cutout slot laterally spaced side walls and a top wall having a cutout slot formed therein;
   a take-up reel having an inner hub with laterally spaced annular flanges extending radially outwardly therefrom;
   a shaft having a first end and a second end, said shaft passing through the inner hub of said take-up reel;
   the front of said cover having an inner surface having a bracket moounted thereon, said bracket having an aperture that receives the first end of said shaft;
   a slip ring connector having a front end, a side wall and a rear end, said front end receives and supports the second end of said shaft, said rear end is mounted on the inner surface of the rear wall of said base member;
   a metal reel spring formed in the shape of a coil having an inner end and an outer end, the inner end of said spring being connected to said shaft and the outer end of said spring being connected to the inner hub of said take-up reel;
   a predetermined length of telephone cord having a first end and a second end, said telephone cord being wound on said take-up reel and having its first end threaded through the cutout slot in said cover;
   a male telephone adapter mounted in the aperture in the rear wall of said base member and extending outwardly therefrom; and
   the second end of said telephone cord being connected to a female socket in the side wall of said slip ring connector.

2. A telephone cord take-up reel as recited in claim 1 further comprising a cord stopper assembly mounted on said telephone cord at a location outside said take-up reel housing.

3. A telephone cord take-up reel as recited in claim 1, wherein said take-up reel has a rectangular configuration.

* * * * *